(12) United States Patent
Boberg et al.

(10) Patent No.: US 9,794,356 B2
(45) Date of Patent: Oct. 17, 2017

(54) POLICY MANAGEMENT (75) Inventors: Christer Carl Boberg, Tungelsta (SE);
Mikael Lars Klein, Huddinge (SE);
Anders Lindgren, Alvsjo (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 1132 days.

(21) Appl. No.: 13/978,155

(22) PCT Filed: Jan. 12, 2011

(86) PCT No.: PCT/EP2011/050345
§ 371 (c)(1),
(2), (4) Date: Oct. 1, 2013

(87) PCT Pub. No.: WO2012/095170
PCT Pub. Date: Jul. 19, 2012

(65) Prior Publication Data
US 2014/0019605 A1    Jan. 16, 2014

(51) Int. Cl.
*G06F 15/16* (2006.01)
*H04L 29/08* (2006.01)
*H04L 12/24* (2006.01)
*H04L 12/911* (2013.01)

(52) U.S. Cl.
CPC .......... *H04L 67/22* (2013.01); *H04L 41/0893* (2013.01); *H04L 47/828* (2013.01)

(58) Field of Classification Search
None
See application file for complete search history.

(56) References Cited

U.S. PATENT DOCUMENTS

| 8,561,149 B2 * | 10/2013 | Labrador ................ H04L 63/10 709/225 |
| 9,094,475 B2 * | 7/2015 | Lee ..................... H04L 12/1827 |
| 9,106,599 B2 * | 8/2015 | Dandison .............. H04L 51/066 |

(Continued)

FOREIGN PATENT DOCUMENTS

| CN | 101087446 A | 12/2007 |
| WO | 2005109794 A1 | 11/2005 |
| WO | 2010148243 A1 | 12/2010 |

OTHER PUBLICATIONS

Poikselkä, M. et al., "The IMS: IP Multimedia Concepts and Services", Jan. 1, 2009, pp. 151-171, 3rd Edition, Wiley & Sons, Chichester.

*Primary Examiner* — Phuoc Nguyen
(74) *Attorney, Agent, or Firm* — Brian Keith Buchheit (57) ABSTRACT

According to a first aspect of the present invention there is provided a method of implementing policy management in an IP Multimedia Subsystem, IMS, for users that are part of an organization or enterprise. The method comprises the steps of separating the users into a plurality of groups, each group being defined by a Group Document that is managed by an XML Document Management Server; for one or more of the groups, including one or more policies in the Group Document of the group; for each of the groups, including in the Group Document identities of groups to which the group is related; and when determining one or more policies that are to be applied to a user, taking account of any policies included in the Group Document of the user's group and any policies included in the Group Document of any related groups.

20 Claims, 6 Drawing Sheets

(56) References Cited

U.S. PATENT DOCUMENTS

| | | | |
|---|---|---|---|
| 9,264,970 B2* | 2/2016 | Park | H04L 12/1818 |
| 9,374,682 B2* | 6/2016 | Weng | H04W 4/06 |
| 2006/0177024 A1 | 8/2006 | Frifeldt et al. | |
| 2006/0242684 A1 | 10/2006 | Russell et al. | |
| 2009/0080404 A1 | 3/2009 | Laurila et al. | |
| 2009/0204673 A1* | 8/2009 | Tian | H04L 12/1822 709/204 |

* cited by examiner

POLICY MANAGEMENT

FIELD OF THE INVENTION

This invention relates to methods and apparatus for implementing policy management in an IP Multimedia Subsystem. More particularly, the invention relates to using groups to implement policy management for users of an IP Multimedia Subsystem.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The UMTS (Universal Mobile Telecommunications System) is a third generation wireless system designed to provide higher data rates and enhanced services to users. UMTS is a successor to the Global System for Mobile Communications (GSM), with an important evolutionary step between GSM and UMTS being the General Packet Radio Service (GPRS). GPRS introduces packet switching into the GSM core network and allows direct access to packet data networks (PDNs). This enables high-data rate packets switch transmissions well beyond the 64 kbps limit of ISDN through the GSM call network, which is a necessity for UMTS data transmission rates of up to 2 Mbps. UMTS is standardised by the 3rd Generation Partnership Project (3GPP) which is a conglomeration of regional standards bodies such as the European Telecommunication Standards Institute (ETSI), the Association of Radio Industry Businesses (ARIB) and others. See 3GPP TS 23.002 for more details.

The UMTS architecture includes a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

Figure 1:
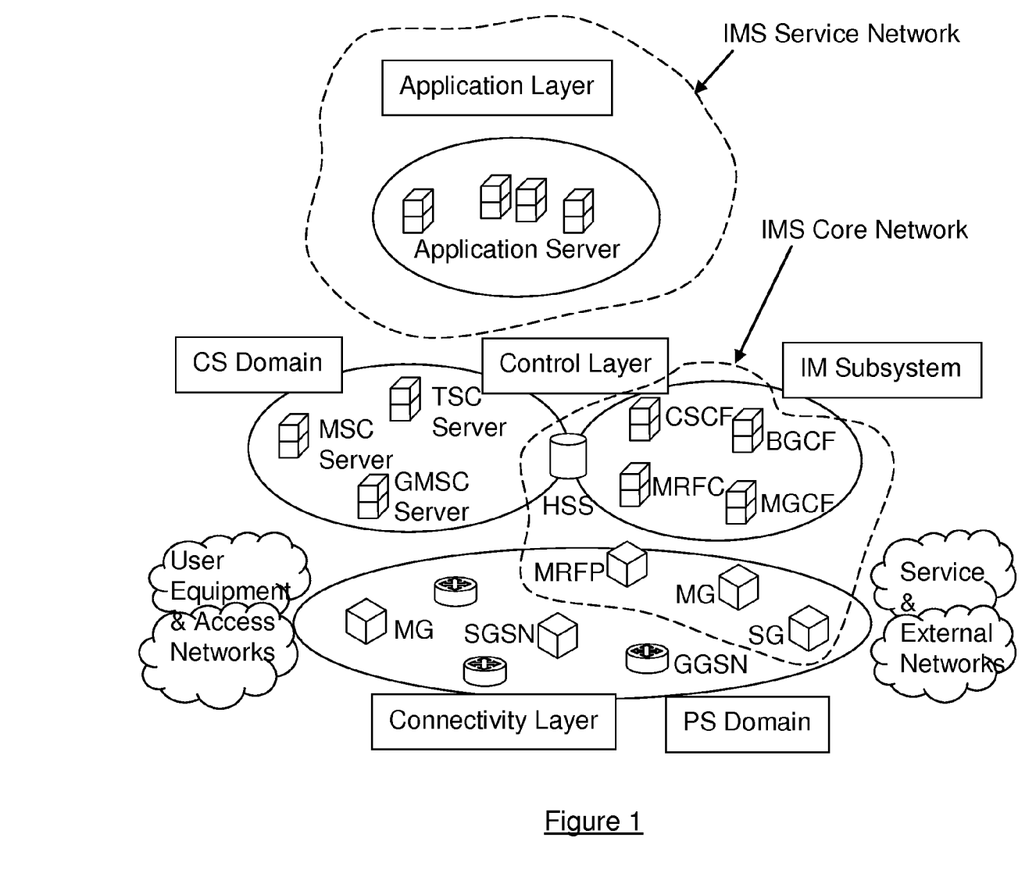
FIG. 1 illustrates schematically the mobile network architecture of a GPRS/PS access network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a user's Subscriber Profile.

An important function of any network is the enforcement of service level policies. These policies dictate what particular users may and may not do, and what they will be charged. Service level policies, which might be thought of as general policy statements, are enforced using detailed policy "rules". Policy rules are installed into a node through which all traffic of the users pass or into multiple nodes, which collectively handle all traffic of the user.

SUMMARY

It has been recognised here that the existing standards for IMS do not provide mechanisms suitable for efficient policy management in an enterprise environment. As such, it is an aim of the present invention to provide means for enabling efficient policy management in an enterprise environment.

According to a first aspect of the present invention there is provided a method of implementing policy management in an IP Multimedia Subsystem, IMS, for users that are part of an organisation or enterprise. The method comprises the steps of:

separating the users into a plurality of groups, each group being defined by a Group Document that is managed by an XML Document Management Server;

for one or more of the groups, including one or more policies in the Group Document of the group;

for each of the groups, including in the Group Document the identities of one or more groups to which the group is related; and when determining one or more policies that are to be applied to a user, taking account of any policies included in the Group Document of the user's group and any policies included in the Group Document of any related groups.

The step of determining one or more policies that are to be applied to a user further may comprise the steps of:

obtaining policies and identities of any related groups from the Group Document of the user's group;

obtaining policies from the Group Documents of the identified related groups; and combining policies of the user's group with the policies of the identified related groups.

A Group Document of a group may include one or more policies that differ from the policies of its related groups. A Group Document of a group may include the identities of all groups to which the group is related. Alternatively, the Group Document of a group may include the identities of related groups to which the group is directly related. The groups to which the group is indirectly related may then be identified from the Group Document of the groups to which the group is directly related. The Group Document of a group may include the identities of related groups that are superior to the group. A superior group is a group whose policies generally take precedence over the policies of another group. For example, if the groups have been organised into a hierarchical structure, then a superior group may be a group that has been placed in a higher level of the hierarchical structure.

The step of combining policies of the user's group with the policies of the identified related groups may comprise any of:
  if a policy of the user's group contradicts a corresponding policy of a superior related group, overriding the policy of the user's group with the policy of the superior related group; and
  if a policy included in the user's group is narrower then a corresponding policy of a superior related group, overriding the policy of the superior related group with the policy of the user's group.

According to a second aspect of the present invention there is provided a method of operating a XML Document Management Server, XDMS. The method comprises the steps of:
  managing a plurality of Group Documents, each Group Document defining a group of users and identifying other groups to which the group is related, one or more of the Group Documents including one or more policies;
  receiving a request for policies that are applicable to an identified group;
  determining the policies applicable to the identified group by taking into account policies included in the Group Document of the identified group and policies included in the Group Document of any related groups; and
  responding to the request with the determined policies.

The step of determining the policies to be applied to the identified group may comprise the steps of:
  using the Group Document of the identified group to identify related groups whose policies should be taken into account;
  retrieving policies from the Group Document of the identified group and the Group Document of each of the identified related groups; and
  combining the policies of the identified group with the policies of the identified related groups.

The step of combining the policies of the identified group with the policies of the related groups may comprise any of:
  if a policy of the identified group contradicts a corresponding policy of a superior related group, overriding the policy of the identified group with the policy of the superior related group; and
  if a policy of the identified group imposes greater limitations then a corresponding policy of a superior related group, overriding the policy of the superior related group with the policy of the identified group.

According to a third aspect of the present invention there is provided an apparatus configured to operate as a XML Document Management Server, XDMS. The apparatus comprises:
  a database for storing a plurality Group Documents each defining a group of users and identifying other groups to which the group is related;
  a receiver for receiving a request for policies relating to an identified group;
  a processor for determining the policies to be applied to the identified group by taking into account policies defined in the Group Document of the identified group and policies defined in the Group Document of any related groups; and
  a transmitter for responding to the request with the determined policies.

The processor may be further arranged to:
  use the Group Document of the identified group to identify related groups whose policies should be taken into account;
  retrieve policies from the Group Document of the identified group and the Group Document of any identified related groups; and
  combine the policies of the identified group with the policies of the identified related groups.

The database may be arranged to store Group Documents that include policies that differ from the policies of the related groups. The database may be further arranged to store Group Documents that include identities of all groups to which a group is related. Alternatively, the database may be arranged to store Group Documents that include the identities of groups to which the group is directly related. If so, then the processor may be arranged to identify the groups that are indirectly related to an identified group from the Group Documents of the groups to which the identified group is directly related. The database may be arranged to store Group Documents that include identities of related groups that are superior to the group.

When combining the policies of the identified group with the policies of the related groups the processor may be further arranged to:
  override a policy of the identified group with a corresponding policy of a superior related group if the policy of the identified group contradicts the corresponding policy of the superior related group; and/or
  override a policy of a superior related group with the corresponding policy of the identified group if the corresponding policy of the identified group imposes greater limitations then the policy of the superior related group.

According to a fourth aspect of the present invention there is provided a method of implementing policy management in an IP Multimedia Subsystem, IMS. The method comprises the steps of:
  adding a user as a member of a group, the group being defined by a Group Document that is managed by a XML Document Management Server, XDMS, that identifies the members of the group and includes policies that are applicable to the group;
  maintaining dynamic data relating to the group members in the Group Document; and
  taking into account the dynamic data included in the Group Document when making a policy decision that is to be applied to the user.

Therein the step of maintaining dynamic data relating to the group members in the Group Document may comprise updating the dynamic data in the Group Document when the status of a group member changes.

The step of making a policy decision that is to be applied to the user may comprise retrieving policies and dynamic data from the Group Document, and evaluating the policies using the dynamic data. The method may further comprise, depending upon the result of the policy decision, updating the dynamic data in the Group Document.

The policies included in the Group Document may comprise a maximum number of session in which members of the group are allowed to participate simultaneously. The dynamic data may comprise the number of sessions in which members of the group are participating. If so, then the step of taking into account the dynamic data included in the Group Document when making a policy decision that is to be applied to the user may comprise determining if the number of sessions in which members of the group are participating is less than the maximum number in which members of the group are allowed to participate.

If the number of sessions in which members of the group are participating is less than the maximum number in which members of the group are allowed to participate, then the method may further comprise determining that the user is allowed to participate in a further session, and updating the number of sessions in which members of the group are participating.

If the number of sessions in which members of the group are participating is not less than the maximum number in which members of the group are allowed to participate, then the method may further comprise determining that the user is not allowed to participate in a further session.

According to a fifth aspect of the present invention there is provided a method of operating an XML Document Management Server, XDMS. The method comprises the steps of:
    managing a plurality of Group Documents, each Group Document defining a group, identifying members of the group and including policies that are applicable to the group;
    maintaining dynamic data relating to group members in the Group Documents;
    receiving a request for policies that are applicable to an identified group;
    retrieving policies and dynamic data from the Group Document of the identified group; and
    responding to the request with the retrieved policies and dynamic data.

The step of maintaining dynamic data relating to group members in the Group Documents may comprise updating the dynamic data in the Group Document when the status of a group member changes.

The method may further comprise receiving a notification that the status of a group member has changed and, if required, updating the dynamic data in the Group Document.

The policies included in Group Documents may comprise a maximum number of session in which members of the group are allowed to participate simultaneously. The dynamic data may comprise the number of sessions in which members of the group are participating. If so, then the method may further comprise receiving a notification that a member of a group is participating in a further session, and updating, in the Group Document, the number of sessions in which members of the group are participating.

According to a sixth aspect of the present invention there is provided a method of operating an entity that is configured to make policy decisions applicable to a user within an IP Multimedia Subsystem, IMS. The method comprises the steps of:
    identifying a group of which the user is a member, the group being defined by a Group Document that is managed by a Group XML Document Management Server, XDMS, and that includes the identities of users that are members of the group;
    retrieving policies and dynamic data stored in the Group Document from the Group XDMS; and
    evaluating the policies using the dynamic data in order to make policy decisions.

The entity may be an Application Server. Alternatively, the entity may be a Policy Decision Point.

The step of identifying a group of which the user is a member may comprise retrieving the identity of a group of which the user is a member from a List XDMS.

The method may further comprise, depending upon the result of the policy decision, notifying the Group XDMS of the decision in order to update the dynamic data stored in the Group Document.

The policies may comprise a maximum number of session in which members of the group are allowed to participate simultaneously. The dynamic data may comprise the number of sessions in which members of the group are participating. If so, then the step of evaluating the policies using the dynamic data may comprise determining if the number of sessions in which members of the group are participating is less than the maximum number in which members of the group are allowed to participate.

If the number of sessions in which members of the group are participating is less than the maximum number in which members of the group are allowed to participate, then the method may further comprise determining that the user is allowed to participate in a further session, and updating the number of sessions in which members of the group are participating. If the number of sessions in which members of the group are participating is not less than the maximum number in which members of the group are allowed to participate, then the method may further comprise determining that the user is not allowed to participate in a further session.

According to a seventh aspect of the present invention there is provided an apparatus configured to operate as an XML Document Management Server, XDMS. The apparatus comprises:
    a database for storing a plurality of Group Documents, each Group Document defining a group, identifying members of the group and including policies that are applicable to the group;
    a processor for maintaining dynamic data relating to group members in the Group Documents;
    a receiver for receiving a request for policies that are applicable to an identified group;
    the processor being arranged to retrieve policies and dynamic data from the Group Document of the identified group; and
    a transmitter for responding to the request with the retrieved policies and dynamic data.

The processor may be further arranged to update the dynamic data in the Group Document when the status of a group member changes.

The receiver may be further arranged to receive a notification that the status of a group member has changed, and the processor is further arranged to update the dynamic data in the Group Document in accordance with the notification.

According to an eighth aspect of the present invention there is provided an apparatus configured to make policy decisions applicable to a user within an IP Multimedia Subsystem, IMS. The apparatus comprises:
    a processor for identifying a group of which the user is a member;
    the processor being arranged to generate a request for policies and dynamic data stored in the Group Document of the identified group;
    a transmitter arranged to send the request to a Group XDMS;

a receiver arranged to receive a response from the Group XDMS, including the policies and dynamic data stored in the Group Document of the identified group; and the processor being further arranged to evaluate the policies using the dynamic data in order to make policy decisions.

The processor may be further arranged to generate a request for the identity of a group of which the user is a member, the transmitter is further arranged to send the request to a Shared Group Usage XDMS, and the receiver is further arranged to receive a response from the Shared Group Usage XDMS, including the identity of the group of which the user is a member.

The processor may be further arranged to generate a message for updating the dynamic data of the group, depending upon the results of the policy decisions, and the transmitter is further arranged to send the message to the Group XDMS.

The apparatus may be configured to operate as an Application Server. Alternatively, the apparatus may be configured to operate as a Policy Decision Point.

BRIEF DESCRIPTION OF THE DRAWINGS

Some embodiments of the present invention will now be described in detail with reference to the accompanying drawings, in which.

DETAILED DESCRIPTION

There will now be described a method of implementing policy management in an IP Multimedia Subsystem (IMS) for users within an organisation or enterprise. According to this method the enterprise is separated into a number of groups of users, each group being related to one or more groups within the enterprise, with policies being defined for each group. When determining the policies that are to be applied for a group within the enterprise, the policies of that group and the policies of the other groups to which the group is related are taken into account.

The "Group" concept for IMS is standardised by the Open Mobile Alliance (OMA). According to these standards, a group is specified by an Extensible Markup Language (XML) Group Document, and comprises a set of user addresses and/or group identities together with the policies and attributes associated with that group. For example, the policies associated with a group may include but are not limited to the maximum number of members allowed in the group, age restrictions/limitations that are to be applied to the group, the identity of the group administrator(s), the identity of the group moderator(s) etc. The user addresses and/or group identities define the members of the group, whilst the group is itself identified by a group identity.

Figure 2:
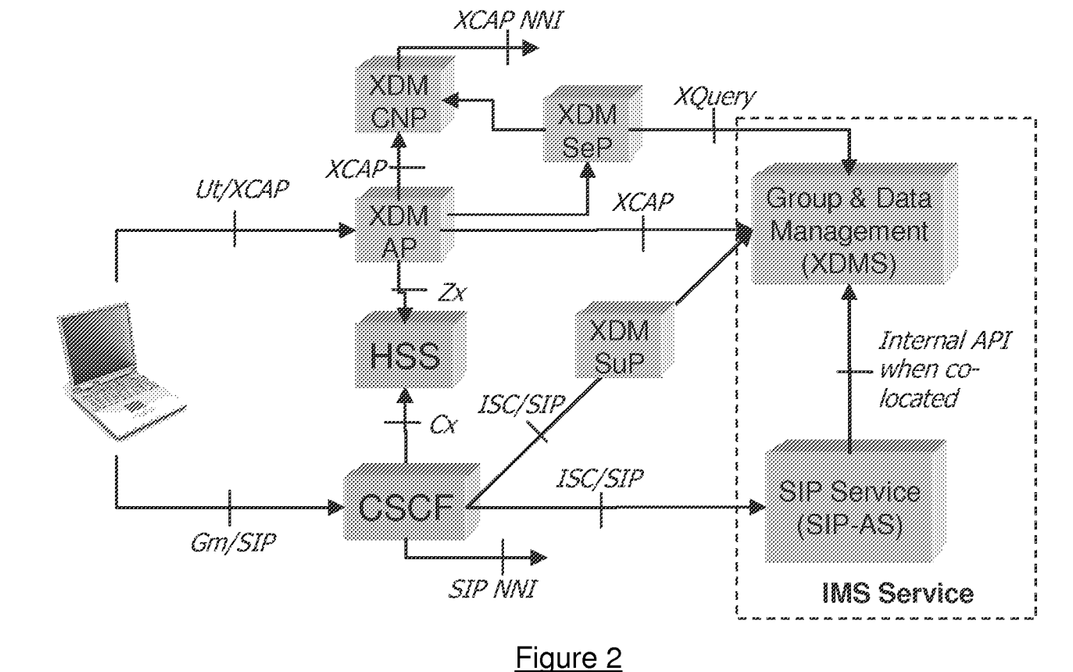
FIG. 2 illustrates schematically an IMS XML document management network.

XML documents are handled by XML Document Management Servers (XDMS) that manipulate the elements and attributes of an XML document according to the conventions described in RFC4825. An XDMS is typically implemented by a HTTP origin server within or co-located with an AS. For example, an XDMS responsible for handling service data relating to Multimedia Telephony (MMTel) services might be co-located with a Multimedia Telephony Application Server (MTAS). FIG. 2 illustrates schematically the IMS XML document management network.

The XML Group Document of a group is maintained by a Shared Group/Group XDMS. A Shared Group/Group XDMS is a server entity that manages and supports the content of Group Documents, performs authorization of incoming SIP and XML Configuration Access Protocol (XCAP) requests, notifies subscribers of changes in Group Documents, provides aggregation of notifications of changes to multiple Group Documents, and provides search results (see OMA XML Document Management Architecture v2.1). XCAP, as specified in IETF RFC4825, is an application layer protocol that facilitates the use of HTTP methods, i.e. GET, PUT, and DELETE, on the elements and attributes of an XML document as identified by a Request-URI. Each application or service that makes use of XCAP defines its own XCAP application usage that provides detailed information on the interaction of the application with an XCAP Server. The application usage for a service defines an ID for the application usage, the structure of the XML document or a fragment of the XML document for that service, using an XML schema, as well as defining other key pieces of information. The XML schema defines the elements and attributes of an XML document and the data type for those elements and attributes. An XML document will contain a reference to a file containing the XML schema for that document.

A typical organisation or enterprise will have a hierarchical structure, wherein the individuals within the enterprise are separated into roles, departments and/or sections, each of which sits at a particular level in the hierarchical structure. In such a structure, a group could be related to one or more groups in the lower levels, one or more groups in the higher levels and/or one or more groups in the same level of the hierarchy. A group that is immediately/directly related to one or more groups in a lower level is referred to as the parent of those one or more lower level groups. Correspondingly, a group that is immediately/directly related to one or more groups in a higher level is referred to as the child of those higher level groups. In addition, groups that are related at the same level are referred to as brother/sister groups. A group could also be related to those groups to which it is not immediately/directly related. For example, a group can be considered to be related to a parent group of it's parent group. The relationship between these groups is then referred to as grandparent and grandchild. To determine the policies that are to be applied for each group, the policies of one or more related groups are taken into account.

Figure 3:
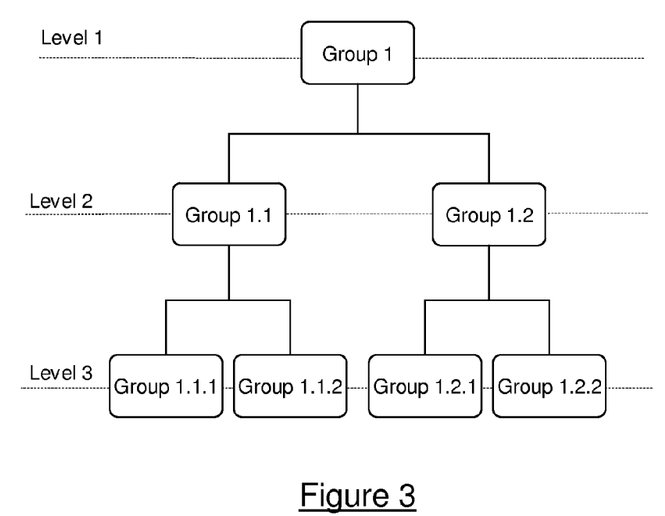
FIG. 3 illustrates an example of an organisation chart showing the hierarchical structure of a typical enterprise.

FIG. 3 illustrates an example of an organisation chart showing the structure of a typical enterprise in which the enterprise has a number of groups at various levels that form a hierarchical structure. As described above, these groups may correspond to departments or sections within the organisation, or may be comprised of individual users that hold positions or have a status within the enterprise that is associated with a particular level of managerial responsibility or privilege. In this example, the hierarchical group structure comprises three levels. There is a single group (Group 1) in the first, highest level (Level 1). This topmost group can be referred to as the root of the hierarchy. This first level group is then a parent to two child groups (Group 1.1 and Group 1.2) that are in the next level down (Level 2), the second level. Each group in the second level is also a parent to two further child groups (Group 1.1.1, Group 1.2.1, Group 1.2.1 and Group 1.2.2) that are in the level below (Level 3), the third level. Of course, any other structure is possible. For example, there may be more or less then three levels, there may also be more than one group in the uppermost level, and each group can be a parent to zero, one, or a plurality of child groups.

Figure 4:
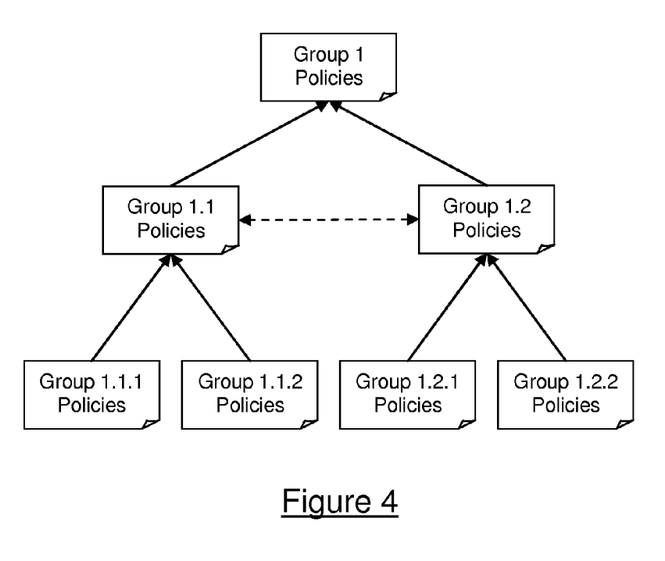
FIG. 4 illustrates an example of a policy chart showing the relationships between the policies of each of the groups of the enterprise illustrated in FIG. 3.

In order to provide efficient policy management for the enterprise, the policies for each group are determined taking into account their relation to other groups in the enterprise. FIG. 4 illustrates an example of a policy chart showing the relationships between the policies of each of the groups of the enterprise illustrated in FIG. 3. In this example, the policies applicable to Group 1.1 and Group 1.2 are determined by taking into consideration the relation of these groups to Group 1. As such, when determining the policies to be applied to Group 1.1, the policies defined in the Group Document of Group 1.1 and the policies defined in the Group Document of Group 1 will both be assessed. For example, if there are any contradictions between the policies or rules that are defined for Group 1.1 and those that are defined for Group 1, then those of Group 1 can override or supersede those of Group 1.1. Similarly, when determining the policies that are to be applied to Group 1.1.1, the policies of Group 1.1 and Group 1 are taken into consideration. In addition to determining the policies that are to be applied to a group by their relation to groups that are higher and/or lower in the hierarchical structure, the policies of other groups in the same level can also be considered when determining the policies to be applied to a group. This is illustrated by the dashed line between Group 1.1 Policies and Group 1.2 Policies in FIG. 4 that indicates that these groups can take account of each others policies as brother/sister groups.

The manner in which the differing policies of two or more groups are combined will depend upon the individual policy management requirements of a particular service or enterprise. However, in most cases it is envisaged that the policies of a superior group will take precedent over the policies of an inferior related group. For example, in the context of the hierarchical structure described above, a group will be superior to a related group if the related group is in a lower level of the hierarchy. Determining the policies in this way provides that:

if any policies and/or rules of a group contradict those of a related group that is inferior, then the policies and/or rules of the superior group will override or supersede the corresponding policies and/or rules of the inferior group, if there are any policies and/or rules that are defined for a group, and for which there is no corresponding policy or rule defined for a related group that is inferior, then those policies and/or rules of the superior group will also apply to the inferior group, and if there are any policies and/or rules that are defined for a group, and for which there is no corresponding policy or rule defined for a related group that is superior, then those policies and/or rules will still apply to that group.

For example, in the case of the hierarchical organisation described above, if the Group Document of Group 1.1 were to include a rule that a session can be active between the hours of 5 AM and 12 PM, whilst the Group Document of Group 1 included a rule that a session can only be active between the hours of 9 AM and 5 PM, then the policy applied to members of Group 1.1 would limit the time that a session can be active to between the hours of 9 AM and 5 PM. As a result, the Group Document of any inferior group need only define those policies and/or rules that are an addition or an extension of those defined for it's related superior groups (e.g. those related groups that are higher in the hierarchy). The Group Document will then identify the groups to which it is related and whose policies should also be taken into account.

In order to identify the other groups whose policies should also be taken into account, the Group Document can either identify only those groups to which it is immediately/directly related (e.g. only its parents), or can identify both those groups to which it is immediately/directly related and all other groups to which it is indirectly related. If the Group Document only identifies those groups to which the group is immediately/directly related, then the indirectly related groups will be identified from the Group Document of the immediately/directly related groups. For example, the Group Document of Group 1.2.1 need only define those policies and/or rules that are an addition to, or differ from those of Group 1.2 and Group 1. The Group Document will also identify either Group 1.2, or both Group 1.2 and Group 1. If the Group Document only identifies Group 1.2, then Group 1 will be identified from the Group Document of Group 1.2.

In addition, aggregation or accumulation of policies can also be implemented when determining the policies that are to be applied to a group. This would provide that, if a policy or rule of a group is narrower than that of a group whose policies are intended to take precedent over it (i.e. imposes greater limitations on the group members), then the narrower policy or rule will apply. As such, if the policy or rule of a group is narrower than that of a related group that is higher in the hierarchy, then the policy or rule of that group will be applied and not that of the higher level group. For example, if the Group Document of Group 1.1 were to include a rule that a session can be active between the hours of 9 AM and 5 PM, whilst the Group Document of Group 1 included a rule that a session can be active between the hours of 5 AM and 12 PM, then the policy applied to members of Group 1.1 would limit the time that a session can be active to between the hours of 9 AM and 5 PM.

Figure 5:
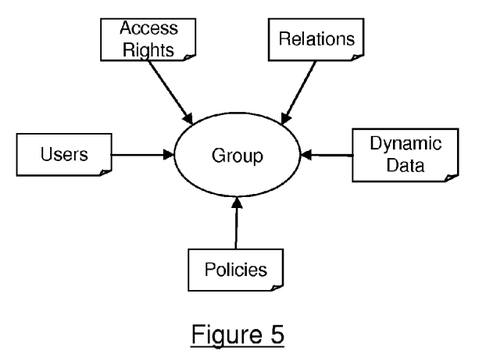
FIG. 5 illustrates schematically the contents of a Group Document.

By making use of groups to implement policy management for users within an enterprise, the methods described above make use of the existing XDM concepts and existing XDMS with only slight modifications. FIG. 5 illustrates schematically the contents of a Group Document that supports the methods described above. The Group Document includes the identities of the users that are members of the group, the policies defined for the group and the access rights for the group. The access rights define who has permission to view and/or amend the details of the group.

In addition to the standard information described above, the Group Document would also define the at least some of the group's relations. For example, the Group Document can identity which groups are a parent to the group, and/or which groups are a child to the group, and/or which groups are brother/sister groups. This enables any entity that wants to determine the policies to be applied to the group to identify the related groups whose policies also need to be taken into consideration. This extended Group Document is managed and stored in a Shared Group/Group XDMS. The functionality of the Group XDMS would also be extended in order to aggregate together a group's policies with those of it's related groups when the applicable policy is requested by an XDM Client (XDMC) or XDM Agent.

Figure 6:
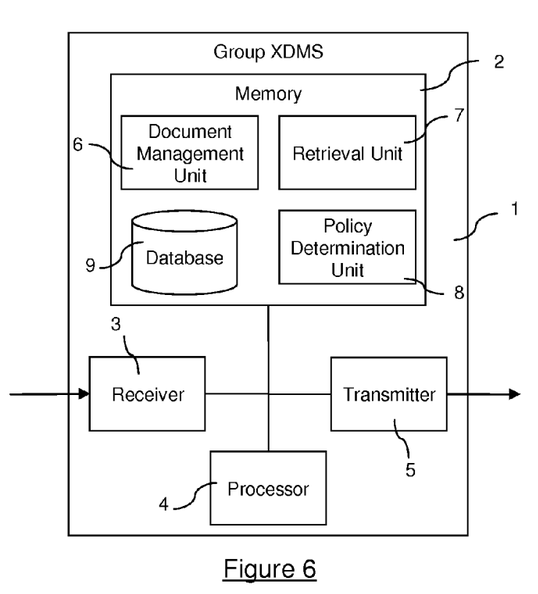
FIG. 6 illustrates schematically an example of a Group XDMS.

FIG. 6 illustrates schematically an example of a Shared Group/Group XDMS 1 for use in implementing the methods described above. The Shared Group/Group XDMS 1 can be implemented as a combination of computer hardware and software and comprises a memory 2, a receiver 3, a processor 4 and a transmitter 5. The memory 2 stores the various programs/executable files that are implemented by the processor 4, and also provides a storage unit for any required data. The programs/executable files stored in the memory, and implemented by the processor, include a document management unit 6, a retrieval unit 7 and a policy analysis unit 8. The memory 2 also stores a database 9 containing the Group Documents of all groups that are part of an enterprise. The processor 4 and the units implemented by the processor are configured to manage the extended Group Documents and to combine/aggregate the policies defined in the Group Documents of related groups.

Figure 7:
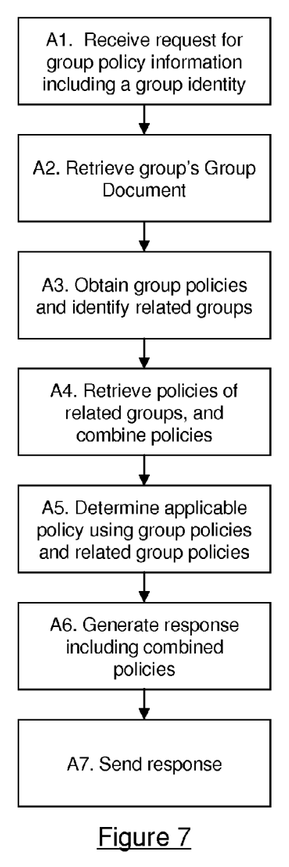
FIG. 7 is a flow diagram illustrating a process implemented by a Group XDMS.

FIG. 7 is a flow diagram illustrating the process implemented by a Shared Group/Group XDMS 1 when a Group Document is requested by an XDMC or XDM Agent. The steps performed are as follows:

A1. A request for policy information relating to/associated with a group is received from an XDMC or XDM Agent by the receiver 3. The request includes the group identity of a group that is part of an enterprise.

A2. The processor 4 implements the Retrieval Unit 7 that uses the group identifier included in the request to obtain/retrieve the group's Group Document from the database 9.

A3. The processor 4 then implements the Document Management Unit 6 to analyse the Group Document in order to obtain any policies included in the Group Document and to obtain the identities of any groups that are related to the group identified in the request.

A4. The processor 4 then implements the Retrieval Unit 7 to obtain/retrieve the policies associated with these groups from their Group Documents stored in the database 9.

A5. The processor 4 then implements the Policy Determination Unit 8 to determine the policies that are applicable to the group by taking account of/considering/analysing the policies included in the Group Document of the group and any policies included in the Group Document of any related groups. To do so, the processor 4 can combine these policies in accordance with some pre-defined procedure in order to determine the policies that should be applied to the group identified in the request. For example, the processor 4 may apply an aggregation procedure in order to combine policies and/or rules that differ between related groups.

A6. The Policy Determination Unit 8 then generates a response that includes the combined policies.

A7. The response is then sent to the XDMC or XDM Agent using the transmitter 6.

Prior to contacting a Shared Group/Group XDMS to request policy information relating to/associated with a group, an XDMC or XDM Agent may need to identify the group(s) to which a user belongs. To do so, it is proposed here that an XDMC or XDM Agent could contact a Shared List/List XDMS. The Shared List/List XDMS is a server entity that manages and supports the content of various List XML documents, including Group Usage List XML documents, performs authorization of incoming Session Initiation Protocol (SIP) and XCAP requests, notifies subscribers of changes in XML documents and provides aggregation of notifications of changes to multiple XML documents. A Group Usage List XML document contains Group Usage Lists that define a list of group identities or service URIs that are known by a user. Whilst the current Group Usage List is manually updated by a user to store the group identities of those groups in which the user is interested, it is proposed here to automatically store the group identities of all groups of which the user is a member in a Group Usage List. An XDMC or XDM Agent could then contact a Shared List/List XDMS with an identity of a user, and the Shared List/List XDMS would respond with a Group Usage List XML document of that user, the Group Usage List XML document including the group identities of all groups of which the user is a member.

As a further extension to the Group Document, the Group Document can also contain dynamic data for the group, the dynamic data being updated whenever there is a change in the status of the group's members. As such, this dynamic data can then be used to implement policies that take into account the current status of the group and its members. For example, this dynamic data can include but is not limited to the current number of sessions in which the members of the group are participating, or the total number of sessions involving members of the group that have taken place during a predefined period. This information can then be used to control the provision of services to the group members.

Figure 8:
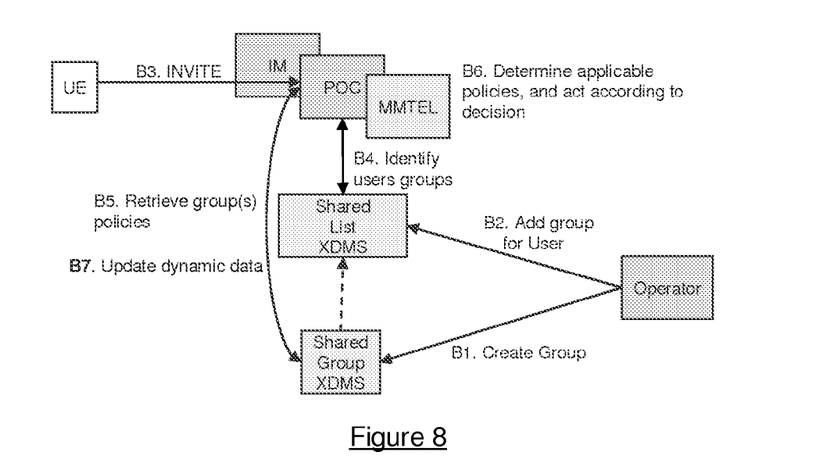
FIG. 8 illustrates an example of a process of establishing and maintaining a group.

FIG. 8 illustrates an example of the process of establishing a group and maintaining the group's dynamic data. The steps performed are as follow:

B1. An operator or administrator creates a new group. A Group Document for the group is stored in the Shared Group/Group XDMS, defining the members of the group and the policies that are to apply to the members of the group.

B2. For each user that is a member of the group, the operator or administrator also informs a Shared List/List XDMS that the user is now a member of this new group. The Shared List/List XDMS maintains a Group Usage List XML document for each user that includes details of the groups that the user is member of. Alternatively, the Shared Group/Group XDMS could update the user's Group Usage List XML document stored in the Shared List/List XDMS whenever a new group is created or the membership of an existing group changes (as illustrated by the dashed line in FIG. 8).

B3. A user that is a member of a group then requests usage of a service provided by an AS (e.g. such as an MMTEL AS, POC Server or IM AS).

B4. The AS then contacts the Shared List/List XDMS in order to obtain the identities of the groups that the user belongs to. The Shared List/List XDMS retrieves the information from the user's Group Usage List XML document, and responds to the AS with the group identities of all groups of which the user is a member. If the service is to involve other users (e.g. it involves both a calling user and one or more called users), then the AS can also obtain the identities of the groups that the other users belong to.

B5. The AS then sends a request for policy information for each of the identified groups to a Shared Group/Group XDMS that stores the Group Documents of the user's groups. The Shared Group/Group XDMS retrieves the policies and dynamic data of each of the identified groups from the corresponding Group Documents, and responds to the AS with this information.

B6. The AS then determines which policies are applicable to the requested service and makes any required decisions based on the group's policies and dynamic data. This will include assessing the policies in view of the dynamic data retrieved for each of the user's groups. The AS then acts in accordance with the determined decision(s).

B7. Depending upon the results of any decision(s) taken in step B6, the AS may also be required to update the dynamic data for each of the user's group, in which the case the AS will send a request, to the Shared Group/Group XDMS, to update the dynamic data of one or more of the user's groups. For example, for a group that a participating user belongs to, the AS can increase by one the number of sessions in which the members of that group are participating.

Figure 9:
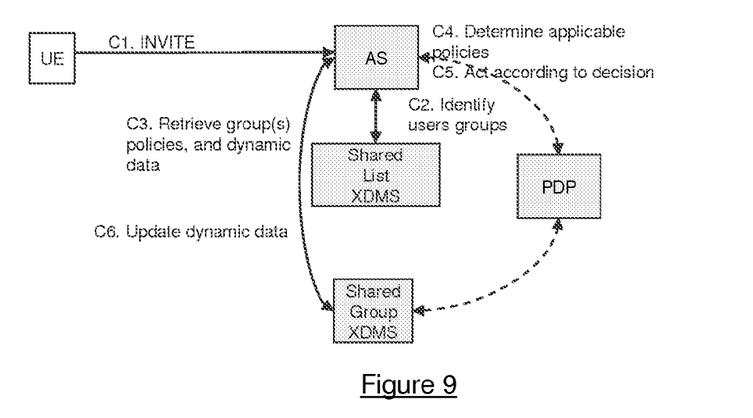
FIG. 9 illustrates an example of a process of implementing group policies

FIG. 9 illustrates an example of the process of using dynamic data to implement group policies. The steps performed are as follow:

C1. A user requests usage of a service provided by an AS.

C2. The AS contacts the Shared List/List XDMS with an identity of the requesting/calling user. The Shared List/List XDMS retrieves the identities of the groups that the user belongs to from the user's Group Usage List XML document and responds to the AS with this information. If the service is to involve other users, the AS may also obtain the identities of the groups that any called users belong to.

C3. The AS then sends a request for policy information for each of the identified groups to a Shared Group/Group XDMS that stores the Group Documents of the user's groups. The Shared Group/Group XDMS retrieves the policies and dynamic data of each of the identified groups from each of the Group Documents and responds to the AS. If a user belongs to more than group, then the AS may have to combine or aggregate the policies of each group in order to determine the policies to be applied for the user. Alternatively, the Shared Group/Group XDMS may combine or aggregate the policies of each group identified in the request from the AS, and respond to the AS with the combined policies.

C4. The AS then determines which policies are applicable to the requested service and makes any required decisions based on the group's policies and dynamic data. This will include assessing the policies in view of the dynamic data retrieved for each of the user's groups.

C5. The AS then acts in accordance with the determined decision(s).

C6. Depending upon the results of any decision(s) taken in step C5, the AS may also be required to update the dynamic data for each of the user's group, in which the case the AS will send a request, to the Shared Group/Group XDMS, to update the dynamic data of one or more of the user's groups.

As an alternative, rather than the AS contacting the Shared Group/Group XDMS directly, the AS could contact a Policy Decision Point (PDP) to request a policy decision. A PDP is an entity that makes a policy decision according to the policies and/or rules applicable to a user. The PDP would then perform steps C3 and C4, including the aggregation/combination of policies for a user belonging to more than one group. The PDP would then inform the AS of a decision made based on the determined policies and/or rules, or could simply provide the aggregated policy information to the AS. This is illustrated by the dashed lines in FIG. 9.

Figure 10:
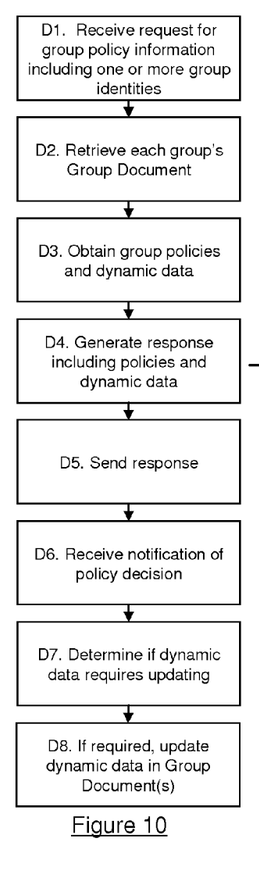
FIG. 10 is a flow diagram illustrating a process implemented by a Group XDMS.

FIG. 10 is a flow diagram illustrating the process implemented by a Shared Group/Group XDMS 1 to maintain the dynamic data included in a group's Group Document. The steps performed are as follows:

D1. A request for policy information relating to/associated with one or more group is received from an XDMC or XDM Agent by the receiver 3. The request includes the group identity of each of the one or more groups.

D2. The processor 4 implements the Retrieval Unit 7 that uses the group identifier(s) included in the request to obtain/retrieve the Group Document of each identified group from the database 9.

D3. The processor 4 then implements the Document Management Unit 6 to process each Group Document to obtain any policies and any dynamic data included in the Group Document.

D4. The Document Management Unit 6 then generates a response that includes the retrieved policies and dynamic data.

D5. The response is then sent to the XDMC or XDM Agent using the transmitter 6.

D6. If the XMDC or XDM Agent makes a policy decision based on the policies and dynamic data, the Shared Group/Group XDMS 1 may receive, via the receiver 3, a notification from the XMDC or XDM Agent of the result of that decision and an identifier for the one or more groups to which that decision relates. For example, if the XMDC or XDM Agent uses the policies and dynamic data provided by the Shared Group/Group XDMS 1 to determine that a user should be allowed to participate in a particular session, then the XMDC or XDM Agent will notify the Shared Group/Group XDMS 1.

D7. The Document Management Unit 6 will then process this notification to determine if the dynamic data stored in the Group Documents of each of the one or more identified groups needs to be updated.

D8. If the dynamic data in any of the Group Documents does require updating, then the Document Management Unit 6 will update the dynamic data in the Group Document accordingly.

Figure 11:
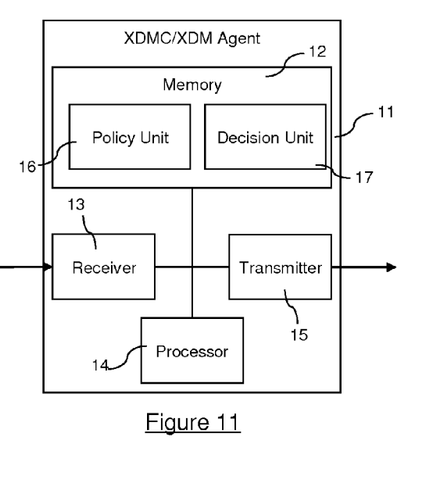
FIG. 11 illustrates schematically an example of a XMDC or XDM Agent.

FIG. 11 illustrates schematically an example of a XMDC or XDM Agent 11 for use in implementing group policies using dynamic data. The XMDC or XDM Agent 11 can be implemented as a combination of computer hardware and software and comprises a memory 12, a receiver 13, a processor 14 and a transmitter 15. The memory 12 stores the various programs/executable files that are implemented by the processor 14, and also provides a storage unit for any required data. The programs/executable files stored in the memory, and implemented by the processor, include a Policy Unit 16 and a Decision Unit 17.

Figure 12:
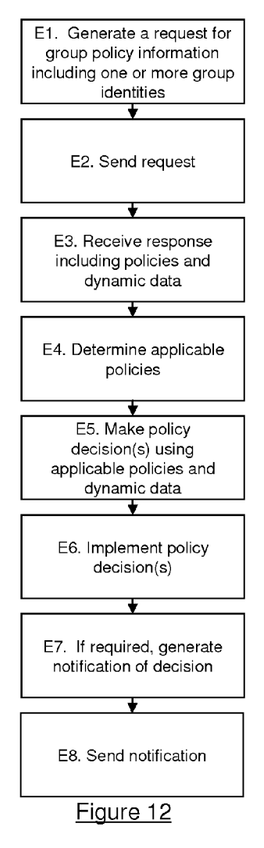
FIG. 12 is a flow diagram illustrating a process implemented by a XMDC or XDM Agent.

FIG. 12 is a flow diagram illustrating the process implemented by a XMDC or XDM Agent to implement group policies using dynamic data included in a group's Group Document. The steps performed are as follows:

E1. The Policy Unit 16 generates a request for policy information relating to/associated with one or more groups. The request includes the group identity of each of the one or more groups.

E2. The request is sent, using the transmitter 15, to a Shared Group/Group XDMS that stores the Group Documents of each of the one or more groups.

E3. A response is received from the Shared Group/Group XDMS, using the receiver 13. The response includes any policies associated with/related to the one or more groups, and any dynamic data associated with/related to the one or more groups.

E4. The processor 4 implements the Policy Unit 16 to determine which policies are applicable depending upon the circumstances in which the policies are to be applied. For example, the XMDC or XDM Agent 11 may have requested policy information relating to groups of which a particular user is a member, the user having request usage of a particular service. The Policy Unit 16 will then determine which policies are applicable to that service.

E5. The processor 4 then implements the Decision Unit 17 to make any required decisions based on the group's policies and dynamic data. This will include assessing the policies in view of the dynamic data retrieved for each of one or more groups.

E6. The Decision Unit 17 then implements the determined decision(s).

E7. Depending upon the results of any decision(s) taken in step E5, the Decision Unit 17 may also generate a notification, for sending to the Shared Group/Group XDMS. The notification includes the result of the decision and an identifier for the one or more groups to which that decision relates.

E8. The notification is then sent to the Shared Group/Group XDMS using the transmitter 15.

Figure 13:
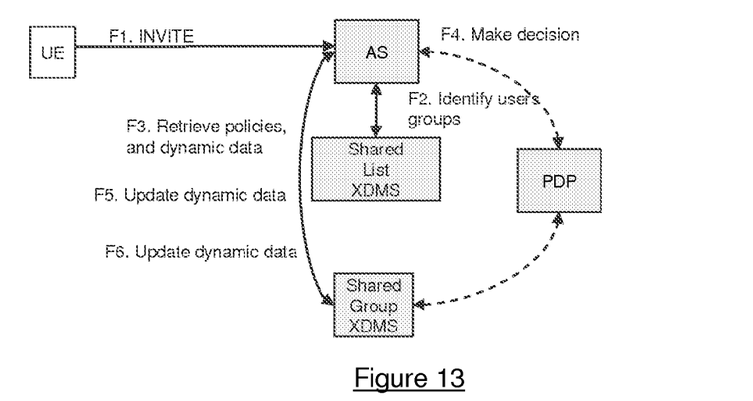
FIG. 13 illustrates an example of a process of using dynamic data to implement Call Admission Control (CAC) for IMS services.

The method described above provides that dynamic data can then be used to implement policies that take into account the current status of the group and its members. By way of example, FIG. 13 illustrates an example of the process of using dynamic data to implement Call Admission Control (CAC) for IMS services. CAC procedures prevent over-use of a service by users. The steps performed are as follows:

F1. A user requests usage of a service provided by an AS. In this example, the user sends a SIP INVITE request to the AS.

F2. The AS requests the identities of the user's groups from the Shared List/List XDMS. The Shared List/List XDMS retrieves the identities of the groups that the user belongs to from the user's Group Usage List XML document and responds to the AS with this information. If the service is to involve other users, the AS may also obtain the identities of the groups that any called users belong to.

F3. The AS sends a request for policy information for each of the identified groups to a Shared Group/Group XDMS that stores the Group Documents of the user's groups. The Shared Group/Group XDMS then retrieves the policies and dynamic data of each of the identified groups from the corresponding Group Documents. In this example, the user is a member of only a single group and the dynamic data for the group includes the number of sessions in which the members of the group are currently participating, and the policies define a maximum number of sessions in which the members of the group can participate simultaneously.

F4. The AS then makes a decision based on the retrieved policies and dynamic data. In this example, the AS determines if the user's participation in the requested session will cause the number of sessions in which the members of the group are currently participating to exceed the maximum number of simultaneous sessions allowed for the group. If the number of current sessions exceeds the maximum number for the group, then the request is rejected.

F5. If the number of current sessions does not exceed the maximum number for the group, then the AS sends a request, to the Shared Group/Group XDMS, to update the dynamic data of the user's group to increase by one the number of sessions in which the members of the group are currently participating. For example, this update could be achieved by sending either an XCAP PUT message, or preferably a SIP PUBLISH message with an expiry time, to the Shared Group/Group XDMS.

F6. When the session ends, the AS again updates the dynamic data stored in the Group Document at the Shared Group/Group XDMS by decreasing by one the number of sessions in which the members of the group are currently participating.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method of implementing policy management in an IP Multimedia Subsystem, the method comprising:

adding a user as a member of a group, the group defined by a Group Document that is managed by a XML Document Management Server that identifies the members of the group and includes policies that are applicable to the group, wherein policies that are applicable to the group is determined by combining policies of related groups identified within the Group Document with a users' group of the Group Document, wherein the combining policies with the policies of the identified related groups comprises any of:

if a policy of the user's group contradicts a corresponding policy of a superior one of the identified related groups, overriding the policy of the user's group with the policy of the superior related group; and if a policy included in the user's group is narrower than a corresponding policy of a one of the identified related groups, overriding the policy of the superior related group with the policy of the user's group;

when making a policy decision that is to be applied to the user, taking into account the dynamic data included in the Group Document, which includes data for the related groups;

wherein the policies included in the Group Document comprise a maximum number of session in which members of the group are allowed to participate simultaneously;

wherein the dynamic data comprises the number of sessions in which members of the group are participating.

2. The method of claim 1, wherein the maintaining dynamic data relating to the group members in the Group Document comprises updating, when a status of a group member changes, the dynamic data in the Group Document.

3. The method of claim 1, wherein the making a policy decision that is to be applied to the user comprises:
retrieving policies and dynamic data from the Group Document; and
evaluating the policies using the dynamic data.

4. The method of claim 1, wherein the taking into account the dynamic data included in the Group Document comprises determining if a number of sessions in which members of the group are participating is less than a maximum number in which members of the group are allowed to participate.

5. The method of claim 4, wherein:
if the number of sessions in which members of the group are participating is less than the maximum number, then:
determining that the user is allowed to participate in a further session; and
updating the number of sessions in which members of the group are participating;
if the number of sessions in which members of the group are participating is not less than the maximum number, then determining that the user is not allowed to participate in a further session.

6. A method of operating an XML Document Management Server, the method comprising:
managing a plurality of Group Documents, each Group Document:
defining a group;
defining related groups to the group;
identifying members of the group; and
including policies that are applicable to the group, wherein policies that are applicable to the group is determined by combining policies of related groups identified within the Group Document with a users' group of the Group Document, wherein the combining policies with the policies of the identified related groups as specified by the Group Document comprises any of:
if a policy of the user's group contradicts a corresponding policy of a superior one of the identified related groups, overriding the policy of the user's group with the policy of the superior related group; and
if a policy included in the user's group is narrower than a corresponding policy of a one of the identified related groups, overriding the policy of the superior related group with the policy of the user's group;
maintaining dynamic data relating to group members in the Group Documents;
receiving a request for policies that are applicable to an identified group;
retrieving policies and dynamic data from the Group Document of the identified group;
responding to the request with the retrieved policies and dynamic data;
wherein the policies included in Group Documents comprise a maximum number of session in which members of the group are allowed to participate simultaneously;
wherein the dynamic data comprises the number of sessions in which members of the group are participating.

7. The method of claim 6, wherein the maintaining dynamic data relating to group members in the Group Documents comprises updating, when a status of a group member changes, the dynamic data in the Group Document.

8. The method of claim 7, and further comprising:
receiving a notification that the status of a group member has changed; and
if required based on the notification, updating the dynamic data in the Group Document.

9. The method of claim 6, further comprising:
receiving a notification that a member of a group is participating in a further session;
updating, in the Group Document, the number of sessions in which members of the group are participating.

10. A method of operating an entity that is configured to make policy decisions applicable to a user within an IP Multimedia Subsystem (IMS), the method comprising:
identifying a group of which the user is a member, the group:
defined by a Group Document that is managed by a Group XML Document Management Server, (XDMS),
including identities of users that are members of the group;
retrieving policies and dynamic data stored in the Group Document from the Group XDMS, wherein retrieved policies that are applicable to the group is determined by combining policies of related groups identified within the Group Document with a users' group of the Group Document, wherein the combining policies with the policies of the identified related groups comprises any of:
if a policy of the user's group contradicts a corresponding policy of a superior one of the identified related groups, overriding the policy of the user's group with the policy of the superior related group; and
if a policy included in the user's group is narrower than a corresponding policy of a one of the identified related groups, overriding the policy of the superior related group with the policy of the user's group;
evaluating the retrieved policies using the dynamic data in order to make policy decisions;
wherein the policies comprise a maximum number of session in which members of the group are allowed to participate simultaneously;
wherein the dynamic data comprises the number of sessions in which members of the group are participating.

11. The method of claim 10, wherein the identifying a group of which the user is a member comprises retrieving an identity of a group of which the user is a member from a List XDMS.

12. The method of claim 10, further comprising, based upon a result of the policy decision, notifying the Group XDMS of the decision in order to update the dynamic data stored in the Group Document.

13. The method of claim 10, wherein the evaluating the policies using the dynamic data comprises determining if a number of sessions in which members of the group are participating is less than a maximum number in which members of the group are allowed to participate.

14. The method of claim 13, wherein:
if the number of sessions in which members of the group are participating is less than the maximum number, then:
determining that the user is allowed to participate in a further session; and updating the number of sessions in which members of the group are participating;

if the number of sessions in which members of the group are participating is not less than the maximum number, then determining that the user is not allowed to participate in a further session.

15. An apparatus configured to operate as an XML Document Management Server, the apparatus comprising:
a database configured to store a plurality of Group Documents, each Group Document:
defining a group;
identifying members of the group;
including policies that are applicable to the group, wherein policies that are applicable to the group is determined by combining policies of related groups identified within the Group Document with a users' group of the Group Document, wherein the combining policies with the policies of the identified related groups comprises any of:
if a policy of the user's group contradicts a corresponding policy of a superior one of the identified related groups, overriding the policy of the user's group with the policy of the superior related group; and
if a policy included in the user's group is narrower than a corresponding policy of a one of the identified related groups, overriding the policy of the superior related group with the policy of the user's group, wherein the policies comprise a maximum number of session in which members of the group are allowed to participate simultaneously;
a processor configured to maintain dynamic data relating to group members in the Group Documents, wherein the dynamic data comprises the number of sessions in which members of the group are participating;
a receiver configured to receive a request for policies that are applicable to an identified group;
the processor further configured to retrieve policies and dynamic data from the Group Document of the identified group; and
a transmitter configured to respond to the request with the retrieved policies and dynamic data.

16. The apparatus of claim 15, wherein the processor is further configured to update the dynamic data in the Group Document when a status of a group member changes.

17. The apparatus of claim 15:
wherein the receiver is further configured to receive a notification that a status of a group member has changed;
the processor is further configured to update the dynamic data in the Group Document in accordance with the notification.

18. An apparatus configured to make policy decisions applicable to a user within an IP Multimedia Subsystem, the apparatus comprising:
a processor configured to:
identify a group of which the user is a member;
generate a request for policies and dynamic data stored in a Group Document of the identified group;
a transmitter configured to send the request to a Group XML Document Management Server (XDMS);
a receiver configured to receive a response from the Group XDMS, the response including the policies and dynamic data stored in the Group Document of the identified group, wherein the policies of the response includes policies that are applicable to the group as determined by combining policies of related groups identified within the Group Document with a users' group of the Group Document, wherein the combining policies with the policies of the identified related groups comprises any of:
if a policy of the user's group contradicts a corresponding policy of a superior one of the identified related groups, overriding the policy of the user's group with the policy of the superior related group; and
if a policy included in the user's group is narrower than a corresponding policy of a one of the identified related groups, overriding the policy of the superior related group with the policy of the user's group;
wherein the policies comprise a maximum number of session in which members of the group are allowed to participate simultaneously;
wherein the dynamic data comprises the number of sessions in which members of the group are participating;
the processor is further configured to evaluate the policies using the dynamic data in order to make policy decisions.

19. The apparatus of claim 18:
wherein the processor is further configured to generate a request for the identity of a group of which the user is a member;
the transmitter is further configured to send the request to a Shared Group Usage XDMS;
the receiver is further configured to receive a response from the Shared Group Usage XDMS, the response including the identity of the group of which the user is a member.

20. The apparatus of claim 18:
wherein the processor is further configured to, based on the results of the policy decisions, generate a message for updating the dynamic data of the group;
wherein the transmitter is further configured to send the message to the Group XDMS.

* * * * *